(12) United States Patent
Sandell et al.

(10) Patent No.: US 7,395,344 B2
(45) Date of Patent: Jul. 1, 2008

(54) METHOD FOR ACARS APPLICATION COMMUNICATION OVER AN IP NETWORK

(75) Inventors: Gordon R. Sandell, Bothell, WA (US); Stephen Y. Lee, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 136 days.

(21) Appl. No.: 11/554,852

(22) Filed: Oct. 31, 2006

(65) Prior Publication Data

US 2007/0130281 A1 Jun. 7, 2007

Related U.S. Application Data

(60) Provisional application No. 60/741,853, filed on Dec. 2, 2005.

(51) Int. Cl.
*G06F 15/16* (2006.01)
*G06F 12/00* (2006.01)
(52) U.S. Cl. .................. 709/230; 709/250; 370/466
(58) Field of Classification Search ................ 709/230, 709/250, 251, 252, 253, 225; 370/254, 466, 370/467, 469
See application file for complete search history.

(56) References Cited

U.S. PATENT DOCUMENTS

| | | | | |
|---|---|---|---|---|
| 6,950,876 | B2 * | 9/2005 | Bright et al. ................ | 709/230 |
| 6,954,797 | B1 * | 10/2005 | Takeda et al. ................ | 709/236 |
| 7,107,358 | B2 * | 9/2006 | Vasko et al. ................ | 709/249 |
| 7,114,171 | B2 * | 9/2006 | Brady et al. ................ | 725/77 |
| 2002/0188776 | A1 | 12/2002 | Houlberg | |
| 2003/0182404 | A1 | 9/2003 | Saint-Etienne et al. | |
| 2005/0267860 | A1 | 12/2005 | Benguigui | |
| 2006/0010438 | A1 * | 1/2006 | Brady et al. ................ | 717/174 |

FOREIGN PATENT DOCUMENTS

| WO | WO02082776 A1 | 10/2002 |
|---|---|---|
| WO | WO2006026632 A2 | 3/2006 |

OTHER PUBLICATIONS

Ehrmanntraut, "System-of-Systems Integration of Air-Ground Telecommunications with the Software Connector", IEEE 22nd Digital Avionics Systems Conf, Oct. 2003, 12 pages.
Combined Foreign Search and Examination Report for Application No. GB0623762.2, dated Mar. 22, 2007, 7 pages.

* cited by examiner

*Primary Examiner*—Zarni Maung
(74) *Attorney, Agent, or Firm*—Lee & Hayes, PLLC

(57) ABSTRACT

Methods and systems are disclosed for preparing to transmit data over a network. In one embodiment, a method includes receiving a request to send message in a first communication protocol, the request to send message having a destination address; causing an initial write request to be transmitted to the destination address using a second communication protocol; and causing a subsequent write request to be transmitted to the destination address using the second communication protocol in response to an indication that an error message was received.

18 Claims, 4 Drawing Sheets

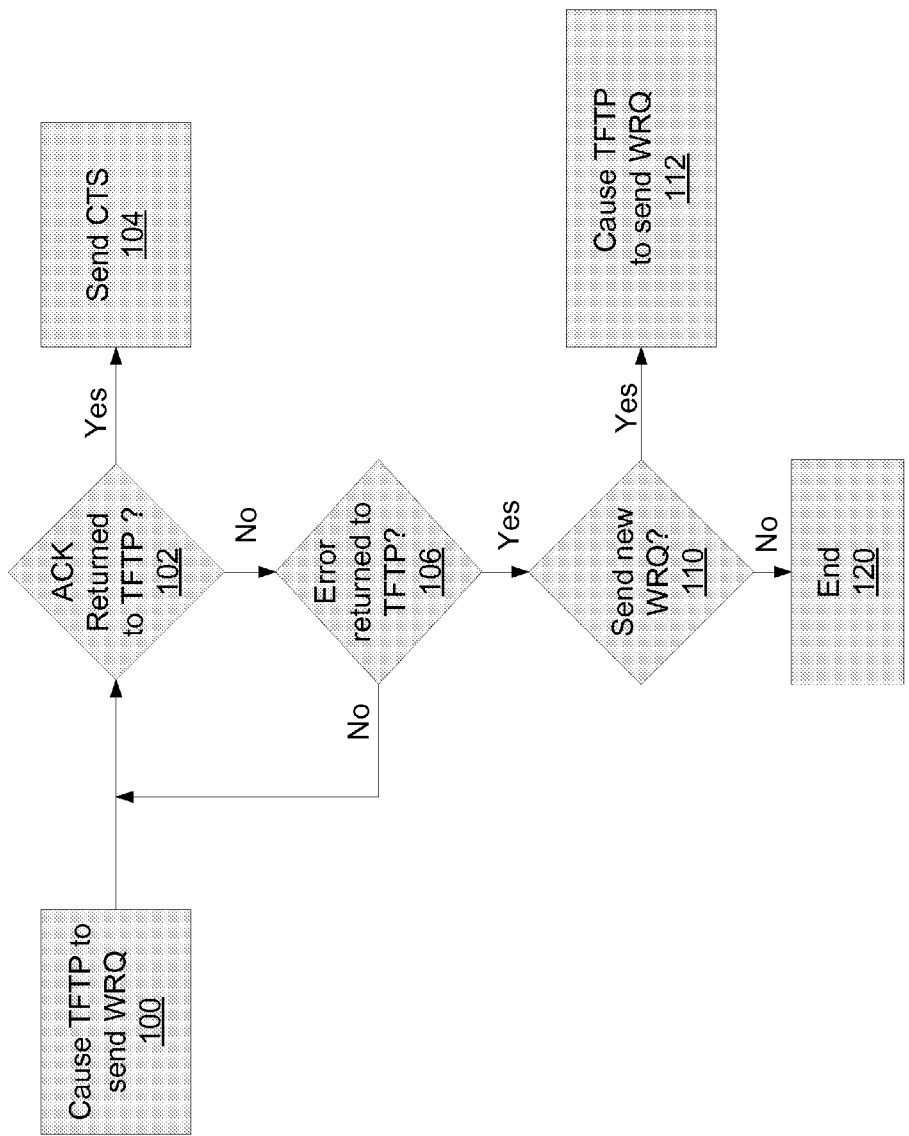

METHOD FOR ACARS APPLICATION COMMUNICATION OVER AN IP NETWORK

CROSS-REFERENCE TO RELATED APPLICATIONS

This application claims the benefit of U.S. Provisional No. 60/741,853, filed Dec. 2, 2005, and incorporated herein by reference.

BACKGROUND OF THE INVENTION

1. Field of the Invention

The invention relates to the systems, devices and methods used to transmit messages over a data network and, more particularly, to systems, devices, and methods that transmit Aircraft Communications Addressing and Reporting System (ACARS) text messages over Ethernet or Avionics Full Duplex (AFDX) data buses.

2. Description of the Related Art

Traditionally, the ARINC 619 protocol, designed specifically for exchange of datalink messages over ARINC 429 point-to-point data busses has been used to transmit and receive ACARS messages. ARINC 619 provides an industry standard specification for formatting of routing information and how it is included it with the data to be exchanged.

The ARINC 429 standard was developed by the aviation industry as a standard communication protocol. Prior art avionics systems used point-to-point (ARINC 429) data buses for communication. As ARINC 429 systems developed the Williamsburg file transfer protocols, defined in ARINC 429P3-18, were developed to transfer files larger than 32 bit words. Thus, in these latter systems, data was transferred using Williamsburg over ARINC 429. As ACARS systems developed the ARINC 619 protocol was developed to provide the required ACARS information. Thus, for ACARS systems, data was transferred using ARINC 619 over Williamsburg/ARINC 429.

In contrast, Ethernet data buses and associated communication protocols were developed by the computer industry to interconnect computers. Ethernet provides for higher data rates and accommodates larger file sizes. However, due to different development paths, Ethernet devices are not directly compatible with ARINC 429 devices. Similarly, network protocols used over Ethernet networks are not directly compatible with legacy devices transmitting and receiving ARINC 619 messages.

Consequently, as avionics system designs migrate from the traditional federated systems using point-to-point (ARINC 429) data buses to an Integrated Modular Avionics (IMA) using networked data buses, such as the Avionics Full Duplex (AFDX) data bus or Ethernet, the need arises to create a protocol to be used across all systems which would minimize the cost of changes to legacy equipment to enable it to use the new data bus architecture.

BRIEF SUMMARY OF THE INVENTION

The present invention addresses the problems identified above by providing methods, equipment and systems that can package an ARINC 619 message for transmission over Ethernet or AFDX buses, or that can un-package an ARINC 619 message received from Ethernet or AFDX buses.

One embodiment of the invention allows an Aircraft Communication, Addressing and Reporting System (ACARS) air/ground router on a networked data bus to interface to an end system that requires ACARS air/ground communication in a manner that avoids significant changes to the ACARS application in the end system.

Another embodiment provides a means for an ACARS air/ground router to use an AFDX data bus to: transfer messages to an ACARS end, and receive messages from an ACARS end system. The communication is enabled between the ACARS air/ground router and the end system by using the characteristics of the ARINC 619 protocol to provide the required ACARS information, and TFTP (Trivial File Transfer Protocol) file transfer service to transfer the data block across the IP network.

A method is disclosed for preparing to transmit data over a network. The method includes receiving a request to send message in a first communication protocol, the request to send message having a destination address; causing an initial write request to be transmitted to the destination address using a second communication protocol; and causing a subsequent write request to be transmitted to the destination address using the second communication protocol in response to an indication that an error message was received.

An embodiment of a system is disclosed that prepares to transmit data over a network. The system includes a message generator generating a request to send message in a first communication protocol, the request to send message including a destination address; a communications protocol interface in communication with the message generator and receiving the request to send message; and a second communication protocol in communication with the interface and a network. The interface includes a request receiver receiving the request to send message; a translator converting the received request to send message to a signal causing an initial write request to be transmitted to the destination address by the second communication protocol; a error receiver receiving an error signal from the second communication protocol; and a re-transmitter causing the second communication protocol to transmit a subsequent write request to the destination address in response to the error signal received by the error receiver.

An embodiment of a device is also disclosed that prepares to transmit data over a network. The device includes a receiver receiving a request to send message in a first communication protocol, the request to send message including a destination address; a transmitter causing an initial write request to be transmitted to the destination address using a second communication protocol; and a re-transmitter causing a subsequent write request to be transmitted to the destination address using the second communication protocol in response to an indication that an error message was received.

BRIEF DESCRIPTION OF THE SEVERAL VIEWS OF THE DRAWINGS

The accompanying drawings incorporated in and forming part of the specification illustrate several aspects of the present invention. In the drawings:

FIG. 5 illustrates an exemplary process for the responses illustrated in FIG. 2 and FIG. 4.

Figure 1:
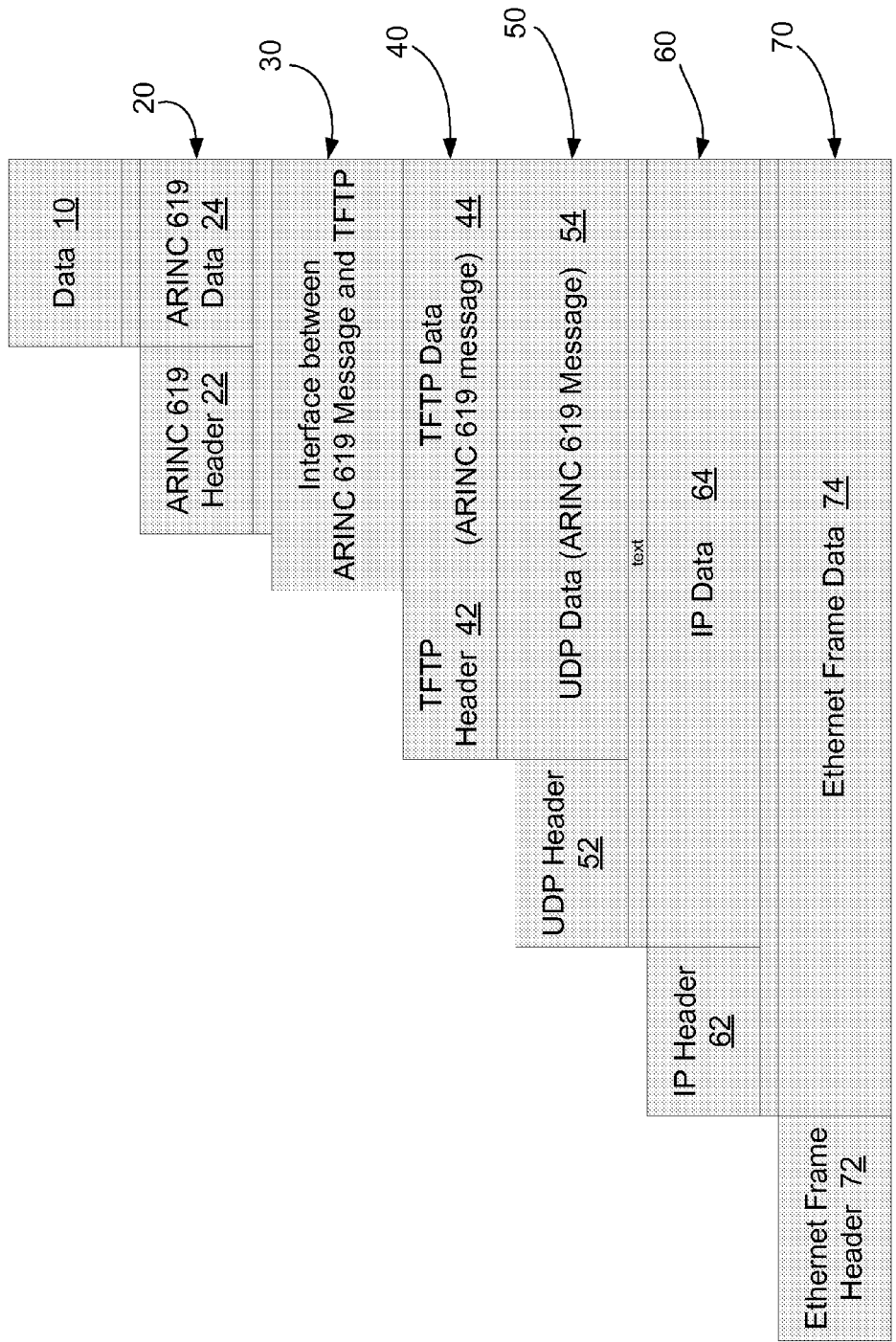
FIG. 1 illustrates one embodiment of the invention as an interface layer between a message layer and a TFTP layer.

Reference will now be made in detail to various embodiments of the invention, examples of which are illustrated in the accompanying drawings.

DETAILED DESCRIPTION OF THE INVENTION

The present invention relates to systems and methods for interfacing between network data bus applications and avionics data buses. Many specific details of certain embodiments of the invention are set forth in the following description and in FIGS. 1-5 to provide a thorough understanding of such embodiments. One skilled in the art, however, will understand that the present invention may have additional embodiments, or that the present invention may be practiced without several of the details described in the following description.

In the following detailed description, references are made to various specific embodiments of avionics data buses, such as a current industry-standard data bus known as the ARINC 664 (AFDX), to specific embodiments of general network data buses, such as the widely-used Ethernet data buses, to specific embodiments of avionics network protocols, such as the widely-used ARINC 619 protocol, and to specific embodiments of general network protocols, such as the widely-used trivial file transport protocol (TFTP). Such references to specific embodiments of data buses and protocols are made for the sake of brevity and to improve a reader's understanding of the invention through a discussion of specific embodiments of the invention. It should be appreciated, however, that the invention is not limited to these specific embodiments of data buses and protocols, and that alternate embodiments of the invention may be conceived that operate with various other types and models of data buses and protocols.

The AFDX data bus is described by ARINC 664. The bus is generally described as an Ethernet bus in which all data is scheduled for transmission. This provides a guarantee that data will be transmitted between systems. To provide this guarantee, each system is limited in the size of the message it will transmit, and the period that it will be scheduled for transmission. The ARINC 664 standard is herein incorporated by reference.

The ARINC 429 bus protocol is described by ARINC 429. This protocol provides for data transfer over a periodic data bus. This protocol is used by many legacy avionics systems, especially equipment used for datalink communications. ARINC 429 will operate at bus speeds of up to 100 Kbps. The entire ARINC 429 standard is herein incorporated by reference.

The Williamsburg file transfer protocol is described by ARINC 429P3. This protocol provides for block data transfer over a periodic data bus. This protocol is used by many legacy avionics systems, especially equipment used for datalink communications. Version 1 of the Williamsburg file transfer protocol allows for transmission of up to 65000 32 bit words, and also dictates timers and counters that must be used for successful communication.

The Trivial File Transfer Protocol (TFTP) is a simple lightweight standard client server protocol layered on top of the User Datagram Protocol (UDP). The TFTP is specified in the Request For Comment (RFC 1350—The TFTP Protocol (revision 2); RFC 2347—TFTP option extension; RFC 2348—TFTP block size option; and RFC 2349—TFTP timeout interval and transfer size option. RFC 1350, RFC 2347, RFC 2348, and RFC 2349 are herein incorporated by reference.

ARINC 619 is a standard avionics message protocol used in ACARS systems. ARINC 619 is hereby incorporated by reference.

To provide ACARS communication to an end system, significant quantities of data may be exchanged, along with routing information such as origin, destination, and air/ground subnetwork preference. In addition, the communication method may require exchanging delivery confirmation information.

One embodiment of the present invention utilizes the router formatting provided by ARINC 619 to enable reuse of existing functionality that may exist in the end system. The ARINC 619 header typically contains an origin, destination, purpose, media selection, priority, and lifetime codes.

The ARINC 619 data block may be encapsulated in an AFDX message or Ethernet packet using an RFC compliant Trivial File Transfer Protocol (TFTP) as a means of providing reliable delivery across the Ethernet or AFDX network. Other file transfer protocols that are compatible with Ethernet networks could be used. Additionally, other networks and transfer protocols may be used. This approach may be used for both messages from the airborne end system to the ground, and from the ground to the airborne end system, as well as acknowledgements/rejections in both directions. The RFC compliant TFTP provides for a cost effective protocol due to its widespread utilization in IP networks.

In a traditional Avionics system, ARINC 619 messages are exchanged over a pair of ARINC 429 data buses, using the Williamsburg file transfer protocols (which are defined in ARINC 429). In version 1 of the Williamsburg protocol, the system, device or application wanting to send a message transmits a Request To Send (RTS). This is then acknowledged by the recipient with a Clear To Send (CTS), Not Clear To Send (NCTS) or BUSY. Or, of course, there may be no response.

If the response is a CTS, then the sending system starts transmitting the message as a series of blocks. There are checksums on each block, and the receiving system checks each block and acknowledges it. Thus, at the end of the transmission there is confidence that the complete message has been received.

If one of the other responses (or no response) is received, then the Williamsburg protocol provides for a series of attempts to complete the message transfer. As an example, if high-speed ARINC 429 buses are used, it provides for: Up to 5 retries 100-140 mS apart for NCTS responses; Up to 20 retries 1.0-1.2 seconds apart for BUSY responses; Up to 5 retries 150-200 mS apart when there is no response to the RTS.

TFTP provides some retries in the event of there being no response (i.e. the response is timed out), and UDP (below the TFTP) provides a checksum mechanism to assure the integrity of the transfer. However, TFTP simply provides error codes in those situations where the system is not able to accept the transfer. The following error codes are possible: 0—Not defined, see error message (if any); 1—File not found; 2—Access violation; 3—Disk full or allocation exceeded; 4—Illegal TFTP operation; 5—Unknown transfer ID; 6—File already exists; and 7—No such user.

Accordingly, one embodiment of the present invention provides an interface between the system, device or application generating an ARINC 619 message and the TFTP process. This interface may provide a mechanism to deal with these error codes and may provide for retries (when appropriate) and termination of the transfer when necessary.

FIG. 1 illustrates interface 30 as a layer between the ARINC 619 message 20 and TFTP 40. The ARINC 619 message 20 includes ARINC 619 data 24 and an ARINC 619 header 22. The ARINC 619 header 22 may include origin, destination, purpose, media selection, priority, and lifetime codes, etc., as required or allowed by ARINC 619. The ARINC 619 data 24 includes the data 10 to be transmitted by an originating device or application. In some embodiments, data 10 may be a text message from the originating device or application.

The TFTP layer 40 creates a TFTP header 42 and packages the data provided by interface 30 into TFTP data 44 as is well known in the art. Similarly, the UDP layer 50, IP layer 60 and frame or data link layer 70 creates respective UDP header 52, IP header 61 and Frame header 72, and packages the message received into respective UDP data 54, IP data 64, and Frame data 74.

Figure 2:
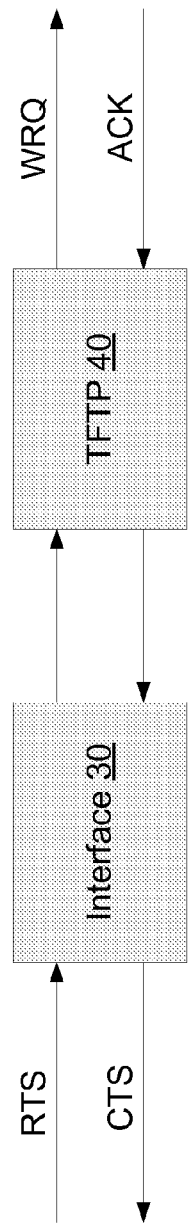
FIG. 2 illustrates an exemplary response to the receipt of a request to send (RTS) message.
Figure 3:
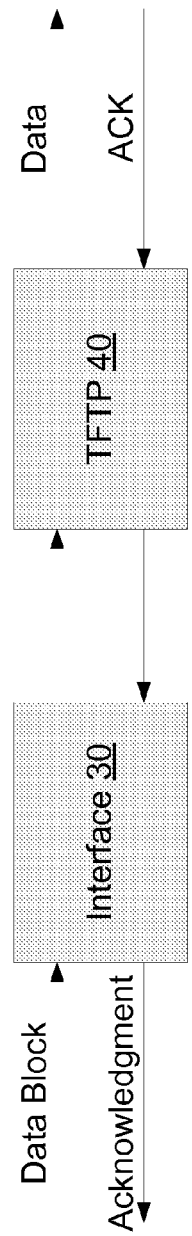
FIG. 3 illustrates an exemplary data block transmission response.
Figure 4:
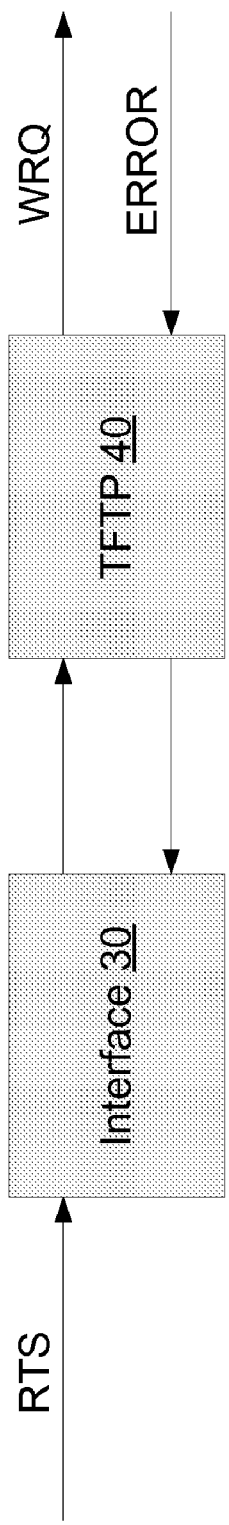
FIG. 4 illustrates another exemplary response to the receipt of a request to send (RTS) message.

FIGS. 2-4 illustrate various message or data interchanges across interface 30. FIG. 2 illustrates an example of a response to a request to sent (RTS) message. In one embodiment, when the interface 30 receives a RTS message, the interface 30 causes TFTP 40 to send a write request (WRQ) to the application or device identified in the RTS message. When TFTP 40 receives an acknowledgement (ACK), the interface 30 sends a clear to send (CTS) message to the application or device that sent the RTS message.

An example of a process that interface 30 may use in the message flow shown in FIG. 2 is illustrated in blocks 100, 102 and 104 of the flow chart shown in FIG. 5. In block 100 the interface 30 causes TFTP 40 to send a write request (WRQ) to the destination identified in the request to send (RTS) message. In block 102 the interface determines whether the TFTP 40 received an acknowledgement. After the interface 30 receives an acknowledgement or other indication that TFTP 40 received an acknowledgement from the destination identified in the request to send (RTS) message, the interface 30 may send a clear to send message to the application of device that sent the request to send (RTS) message in block 104.

Typically, the application or device responds to the CTS message by sending a data block as shown in FIG. 3. Interface 30 passes the data to TFTP 40. TFTP 40 packages and sends the data in accordance with the TFTP protocol. TFTP 40 receives an acknowledgement (ACK) for each packet sent. When the interface 30 receives an acknowledgement for each packet used to send the data block, the interface 30 sends an acknowledgement to the application or device that sent the data block.

FIG. 4 illustrates an exemplary response when TFTP 40 receives an error in response to the write request (WRQ). When TFTP 40 receives the error, interface 30 could end the process or cause TFTP 40 to send another write request. In some embodiments, the interface 30 may send one or more messages to the application or device indicating an error, a busy or not clear to send condition.

FIG. 5 illustrates an example process that interface 30 may use to determine whether to send a subsequent write request. If the interface 30 does not receive an indication that TFTP 40 received an acknowledgement in block 102, then interface 30 may check to see it TFTP 40 received an error message in block 106. If an error message is not received the process flow may return to block 102. In some embodiments there may be a predetermined delay time before the process flow returns to block 102. In other embodiments there may be a delay before the interface 30 checks for the error message in block 106.

If interface 30 determines that an error message was returned to TFTP 40, then the process flow may move to block 110. At block 110, the interface 30 determines whether a subsequent write request (WRQ) should be sent. When interface 30 determines that a subsequent write request should not be sent, then the process may end at block 120. If a write request (WRQ) is to be sent, the process flow moves to block 112. In block 112, the interface 30 causes TFTP 40 to send a write request. In some embodiments the interface 30 immediately causes TFTP 40 to send a write request. In other embodiments, the interface 30 may wait a predetermined time before causing TFTP 40 to send a write request. In some embodiments the predetermined time may be based on the error message received by TFTP 40. In other embodiments the predetermined time may be based on various other conditions, including one or more of the following: number of write requests sent; number of error messages received; the amount of time that has elapsed since the first write request; the amount of time that has elapsed since the first error message; the amount of time that has elapsed since the request to send (RTS) was received; or the amount of time that the application or device that sent the request to send (RTS) may wait before sending another request to send message.

In summary, numerous benefits are described which result from employing the concepts of the invention. The foregoing description of an exemplary preferred embodiment of the invention is presented for the purposes of illustration and description. It is not intended to be exhaustive or to limit the invention to the precise form disclosed. Obvious modifications or variations are possible in light of the above teachings. The above-described embodiments were selected and described in order to best illustrate the principles of the invention and its practical application, to thereby enable one of ordinary skill in the art to best utilize the invention in various embodiments and with various modifications as are suited to particular uses contemplated. It is intended that the scope of the invention be defined by the claims appended hereto.

We claim:

1. A method for transmitting data over a network, the method comprising:

receiving a request to send message in a first communication protocol, the request to send message including a destination address;

causing an initial write request to be transmitted to the destination address using a second communication protocol; and causing a subsequent write request to be transmitted to the destination address using the second communication protocol in response to an indication that an error message was received, wherein the first communication protocol is ARINC protocol, and the second communication protocol is Trivial File Transfer Protocol (TFTP).

2. The method of claim 1, wherein the ARINC communication protocol is ARINC 619.

3. The method of claim 1, wherein the subsequent write request is caused to be transmitted after a predetermined time.

4. The method of claim 3, wherein the predetermined time is based on the error message received.

5. The method of claim 3, wherein the predetermined time is based on a number of subsequent write requests caused to be transmitted.

6. The method of claim 3, wherein the predetermined time is based on a number of error messages received.

7. A device for transmitting data over a network, the device comprising:

a receiver component configured to receive a request to send message in a first communication protocol, the request to send message including a destination address; and a transmitter component configured to cause an initial write request to be transmitted to the destination address using a second communication protocol and configured to cause a subsequent write request to be transmitted to the destination address using the second communication protocol in response to an indication that an error message was received, wherein the first communication protocol is ARINC protocol, and the second communication protocol is Trivial File Transfer Protocol (TFTP).

8. The device of claim 7, wherein the ARINC communication protocol is ARINC 619.

9. The device of claim 7, wherein the subsequent write request is caused to be transmitted after a predetermined time.

10. The device of claim 9, wherein the predetermined time is based on the error message received.

11. The device of claim 9, wherein the predetermined time is based on a number of subsequent write requests caused to be transmitted.

12. The device of claim 9, wherein the predetermined time is based on a number of error messages received.

13. A system for transmitting data over a network, the system comprising:
   a message generator generating a request to send message in a first communication protocol, the request to send message including a destination address;
   a communications protocol interface in communication with the message generator and receiving the request to send message; and
   a second communication protocol in communication with the interface and a network,
   wherein the communications protocol interface comprises:
   a request receiver receiving the request to send message;
   a translator converting the received request to send message to a signal causing an initial write request to be transmitted to the destination address by the second communication protocol;
   a error receiver receiving an error signal from the second communication protocol; and
   a re-transmitter causing the second communication protocol to transmit a subsequent write request to the destination address in response to the error signal received by the error receiver, wherein the first communication protocol is ARINC protocol, and the second communication protocol is Trivial File Transfer Protocol (TFTP).

14. The system of claim 13, wherein the ARINC communication protocol is ARINC 619.

15. The system of claim 13, wherein the communications protocol interface is further configured to delay the error signal received by the error receiver for a predetermined time before sending the error signal to the re-transmitter.

16. The method of claim 15, wherein the predetermined time is based on the error signal received.

17. The method of claim 15, wherein the predetermined time is based on a number of subsequent write requests caused to be transmitted.

18. The method of claim 15, wherein the predetermined time is based on a number of error signals received.

* * * * *